(No Model.)
W. HARKNESS.
FINDER FOR PHOTOGRAPHIC CAMERAS.
No. 385,513. Patented July 3, 1888.
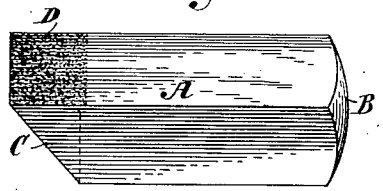
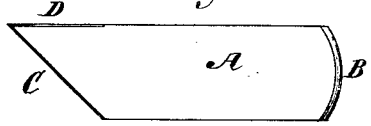
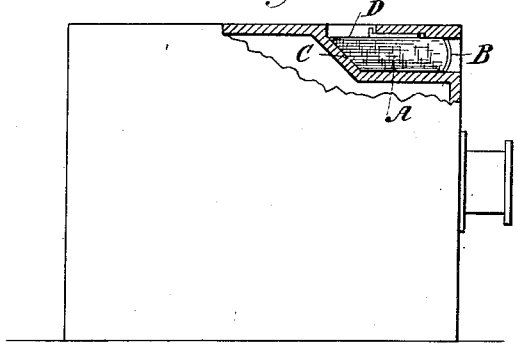
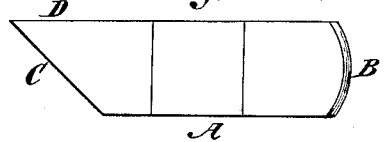
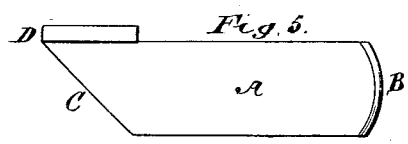
Witnesses
Maurice J Roach
W. A. Raban
Inventor
William Harkness
By his Attorneys
Gifford & Howe

UNITED STATES PATENT OFFICE.

WILLIAM HARKNESS, OF FISHKILL, ASSIGNOR TO THE SCOVILL MANUFACTURING COMPANY, OF NEW YORK, N. Y.

FINDER FOR PHOTOGRAPHIC CAMERAS.

SPECIFICATION forming part of Letters Patent No. 385,513, dated July 3, 1888.

Application filed December 10, 1887. Serial No. 257,522. (No model.)

*To all whom it may concern:*

Be it known that I, WILLIAM HARKNESS, of Fishkill-on-the-Hudson, in the State of New York, have invented a certain new and useful Improvement in Finders for Photographic Cameras, of which the following is a specification.

I will describe in detail a finder for photographic cameras embodying my improvement and then point out the novel features in the claims.

In the accompanying drawings, Figure 1 is a perspective view of a finder embodying my improvement. Fig. 2 is a side elevation of the same. Fig. 3 illustrates the same in a convenient position in a photographic camera. Fig. 4 illustrates a finder of modified form. Fig. 5 illustrates a finder of another modified form.

Similar letters of reference designate corresponding parts in all the figures.

The body A of the finder is made of glass or similar material, and is either solid, as shown in Figs. 1, 2, and 3, or composed of two or more pieces firmly cemented together, as shown more clearly in Figs. 4 and 5. At one end it is provided with a convex lens, B, formed integral with the body of the finder and constituting a refracting-surface on the finder.

The body A of the finder is rectangular in the cross-section, and the lens B is of corresponding rectangular outline.

The rear portion, C, of the finder is inclined, preferably, at an angle of forty-five degrees, and constitutes a reflecting-surface. The reflecting-surface may be either unsilvered or silvered, as may be found expedient.

The portion D of the finder immediately above the inclined reflecting portion C will preferably be ground, although I do not deem this wholly essential. It may be advantageous also to grind that portion of the finder upon the sides thereof between the inclined reflecting portion C and the ground portion D. I have so illustrated it.

I have in Fig. 2 shown the reflecting-surface C silvered and have exaggerated the silvering and also the ground portion D in order to conduce to clearness of illustration.

The finder having been placed in a suitable camera-box—as, for instance, such a one as is shown in Fig. 3—when the finder is exposed an image presented will be refracted through the lens B onto the reflecting-surface C, and thence reflected on the ground-glass surface D in case the surface above the reflecting-surface C should be ground.

I may, if desired, coat the sides of the finder other than the portions thereof which are ground, with an opaque material—such, for instance, as black paint or varnish.

In Figs. 4 and 5 I have shown finders composed of separate pieces, d, of glass secured together by transparent cement. In Fig. 5 the piece d is secured to the finder at the portion D thereof. This portion may extend through an aperture in a box or case in which the finder is arranged. It may have the ground surface upon it if desirable.

What I claim as my invention, and desire to secure by Letters Patent, is—

1. A finder for photographic cameras, made of glass or like material and comprising a body portion, a lens at one end, and an inclined reflecting-surface at the other end, substantially as specified.

2. A finder for photographic cameras, composed of a single piece of glass or like material and comprising a body portion, a lens, and an inclined reflecting-surface, substantially as specified.

3. A finder for photographic cameras, composed of glass or like material which is rectangular in the cross-section, a lens of corresponding rectangular outline, and an inclined reflecting-surface, substantially as specified.

4. A finder for photographic cameras, composed of glass or like material and comprising a body portion, a lens at one end, an inclined reflecting-surface at the other end, and a ground surface above the reflecting-surface, substantially as specified.

WILLIAM HARKNESS.

Witnesses:
   D. RITTENHOUSE,
   HENRY H. FLATHER,
   DAVID RITTENHOUSE.